United States Patent [19]

Brenner et al.

[11] 4,007,898

[45] Feb. 15, 1977

[54] TORQUE COLLAR FOR HIGH TORQUE MOTORS

[75] Inventors: Michael G. Brenner, Pleasanton; Gordon M. Brenner, Walnut Creek, both of Calif.

[73] Assignee: M.G.B., Inc., Berkeley, Calif.

[22] Filed: May 12, 1975

[21] Appl. No.: 576,971

[52] U.S. Cl. .................... 248/26; 60/39.31; 92/161; 310/91

[51] Int. Cl.[2] .................... F04F 1/06; F02C 7/20

[58] Field of Search .......... 248/26; 310/272, 273, 310/91; 92/161; 60/39.31

[56] References Cited

UNITED STATES PATENTS

| | | | |
|---|---|---|---|
| 2,036,694 | 4/1936 | Hansson | 248/26 |
| 2,182,789 | 12/1939 | Cotanch | 248/26 X |
| 2,217,351 | 10/1940 | Soderquist | 248/26 X |
| 3,556,672 | 1/1971 | Gentile | 60/39.31 |

*Primary Examiner*—J. Franklin Foss
*Attorney, Agent, or Firm*—John K. Uilkema

[57] ABSTRACT

A torque collar provided with adjustable stops to engage torque transmitting members disposed at angularly spaced locations around the stator of a motor. The collar is particularly suited for use with high torque low-speed hydraulic motors wherein some free play between the stator of the motor and the collar is desirable. One embodiment provides for adjustment of the stops through means of screw mountings for the stop surfaces. Another embodiment provides for adjustment of the stops by mounting the stop surfaces on supports which are hydraulically coupled to balance the forces on the angularly disposed torque transmitting members.

4 Claims, 4 Drawing Figures

TORQUE COLLAR FOR HIGH TORQUE MOTORS

BACKGROUND OF THE INVENTION

The present invention relates to a torque collar for high torque, low-speed hydraulic motors and is particularly directed to such a collar for use with motors of the radial piston type wherein the rotor comprises a rotating housing and the stator comprises a stationary cylinder block upon which the housing is mounted. In its more specific aspects, the invention is concerned with such a collar which is of compact construction and provides for limited free play between the stator and the collar and for balancing of the torque forces therebetween.

The prior art relating to torque collars for motors of the type with which the present invention is concerned is typified by arrangements wherein the collar is carried on the end of a relatively long torque arm, which torque arm is connected to a torque resisting support at the end therefrom distal from the collar. Such arrangements are relatively effective, but have the disadvantage that they require considerable space and, as a result, are not well suited for use in environments wherein space is very limited. They also have the disadvantage that they provide no effective means for adjusting the stops carried thereby to assure that angularly disposed stops are simultaneously engaged so that the torque forces applied thereto are balanced. This shortcoming can be particularly detrimental, since unbalanced torque forces can literally destroy the motor supported by the collar.

SUMMARY OF THE INVENTION

The collar of the present invention is designed for use in combination with a high torque motor having a stator, a rotor mounted for rotation relative to the stator, and a plurality of torque transmitting means mounted on the stator in angularly spaced relationship to the axis of rotation of the rotor to resist torque applied to the stator by the rotor. The collar comprises a torque resisting base member, stops carried by the base member and extending therefrom for engagement with the torque transmitting means to transmit torque from the stator to the base member, and means to adjust the stops relative to the torque transmitting means to balance the forces applied to the respective stops in response to the application of torque to the stator by the rotor.

A principal object of the present invention is to provide a torque collar for high torque motors wherein adjustment means is provided to assure that torque forces transmitted from the motor to the collar are balanced.

Another object of the invention is to provide such a collar wherein a degree of free play between the collar and motor may be selectively provided.

Still another object of the invention is to provide such a collar of compact construction ideally suited for use in environments where space is very limited.

With respect to the latter object, it is yet another object to provide such a collar ideally suited for supporting a motor for use in an earth-drilling auger wherein the motor may be disposed to drive a generally vertically extending drive train.

A further object of the invention is to provide such a collar wherein hydraulic balancing means are provided to balance the forces applied to the collar from the motor.

The foregoing and other objects will become more apparent when viewed in light of the accompanying drawings and the following detailed description.

DESCRIPTION OF THE ILLUSTRATED EMBODIMENTS

Figure 1:
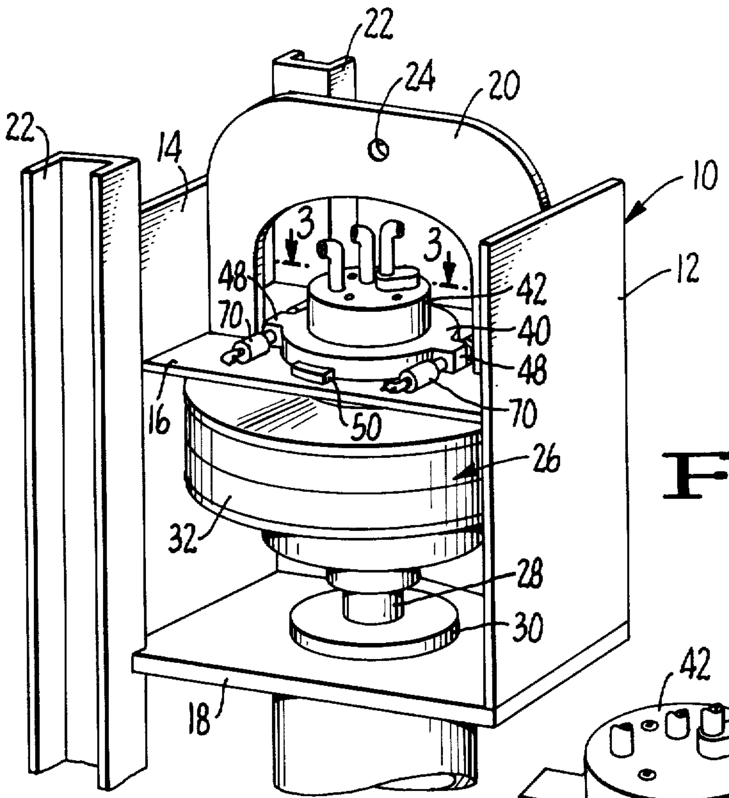
FIG. 1 is a perspective view, with parts thereof broken away, illustrating a lifting bale and hydraulic motor for an earth-boring auger, with a first embodiment of the torque collar of the present invention coupling the stator of the motor to the framework of the lifting bale.

The lifting bale illustrated in FIG. 1 is designated in its entirety by the numeral 10 and comprises vertically extending side plates 12 and 14 rigidly interconnected by horizontally extending support plates 16 and 18. A lifting plate 20 of generally inverted U-shape configuration is also fixedly secured between the side plates 12 and 14, and vertically extending guide channels 22 are fixedly secured to the side edges of the side plate 14. These channels are adapted to be slidably received on the leads of a drilling rig for an earth-boring auger, as is conventional. An eye 24 is provided in the lifting plate 20 for the attachment of a hoist cable so that the bale 10 may be raised and lowered on the leads.

Figure 2:
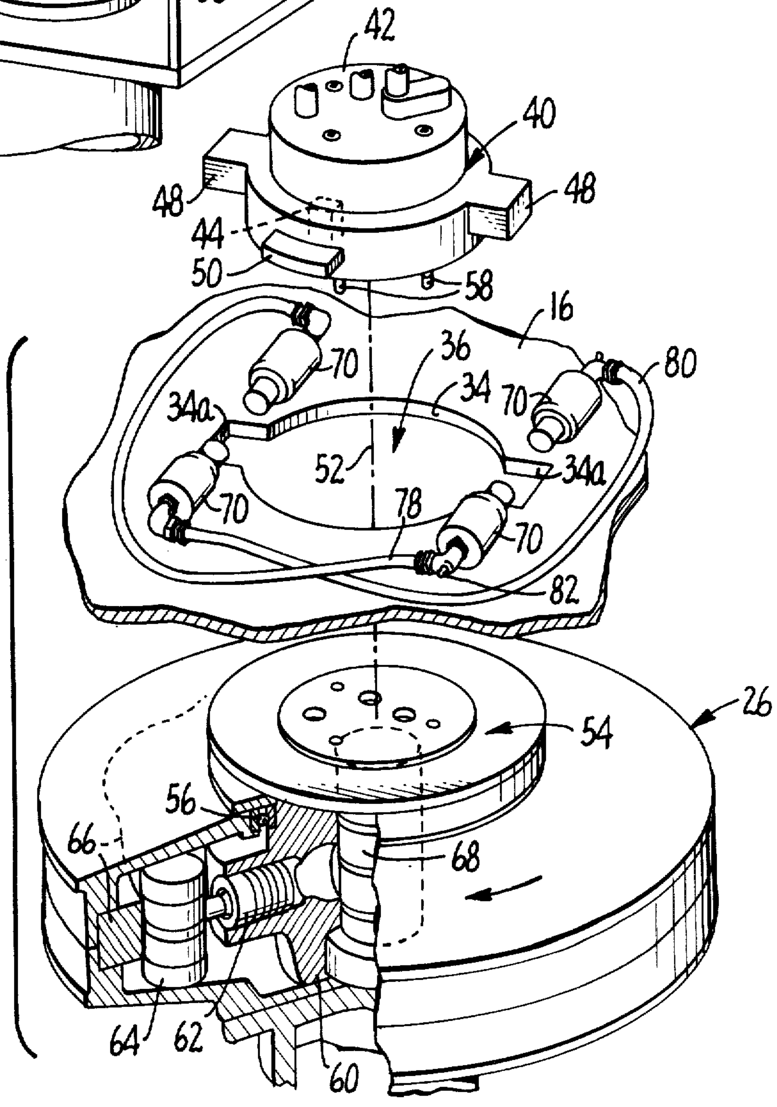
FIG. 2 is an exploded perspective view, with parts thereof broken away, illustrating the collar and motor of the arrangement illustrated in FIG. 1.

The motor illustrated in FIGS. 1 and 2 is designated in its entirety by the numeral 26 and illustrated as being supported between the plates 16 and 18. The motor is supported through its drive shaft 28 by means of a main shaft bearing assembly 30 mounted on the plate 18. The drive shaft 28, as will become more apparent from the subsequent discussion, rotates with a rotatable housing 32 which forms the rotor of the motor. The upper end of the motor is supported within the torque collar of the invention. This collar is defined by the support plate 16 and an opening 34 formed therethrough (See FIG. 2), and will hereinafter be referred to as the torque collar or the torque-resisting base member 36. The opening 34 has a generally circular central portion with rectangular portions 342 extending from diametrically opposed sides thereof.

Mounting of the motor within the torque collar 36 is provided through means of a stator collar 40 keyed to an extension 42 fixed to the stator of the motor. The keyed connection between the stator collar 40 and extension 42 is provided by a pair of keys 44 (See FIGS. 2 and 3) received in diametrically opposed keyways formed in the collar and the extension and functions to secure the collar and extension against rotation relative to one another.

The stator collar 40 comprises a circular central section 46 received within the opening 34 for rotation relative to the torque collar 36 and diametrically opposed extensions 48 fixed relative to the central section and loosely received within the rectangular portions 34*a* of the torque collar opening. The clearance provided between the stator collar 40 and the opening of the torque collar 36 may best be seen from FIGS. 3 and 4. Rigid ear portions 50 are fixed to and extend from diametrically opposed sides of the stator collar 40 for slidable receipt on the upper surface of the plates 16. The ear portions 50 are positioned medially of the depth of the stator collar 40 (See FIG. 2) so that a portion of the circular section 46 extends into the opening 34 and a portion of said section extends above the opening. Thus, the stator collar 40 is supported within the opening 34 for limited rotation relative to the torque collar 36 about the axis of rotation, designated 52, of the rotor of the motor 26.

The illustrated motor 26 is of the hydraulic radial piston type and does not form part of the present invention. A typical motor of this type is manufactured by AB Haggland & Soner of Ornskoldsvik, Sweden. The basic elements of the motor comprise the rotatable housing or rotor 32 and a stator 54 disposed centrally of the rotor. The rotor is supported for rotation relative to the stator by ball bearings, one of which is designated at 56 in FIG. 2. The extension 42 is fixed to the top of the stator 54 by a plurality of bolts 58. Internally, the stator comprises a cylinder block 60 having radial pistons 62 received therein, which pistons carry cam rollers 64 disposed for engagement with a cam ring 66 fixed to and carried inwardly of the rotor 32. A distributor 68 is disposed centrally of the cylinder block 60 to selectively supply hydraulic fluid to the pistons 62 whereby the pistons are forced outwardly in controlled fashion so as to force the cam rollers against the cam ring and turn the rotor relative to the stator. Hydraulic fluid is supplied to the distributor 68 through lines communicating with the distributor through the extension 42. The lines leading to the extension 42 are shown in the drawings as extending from the top surface thereof.

Figure 3:
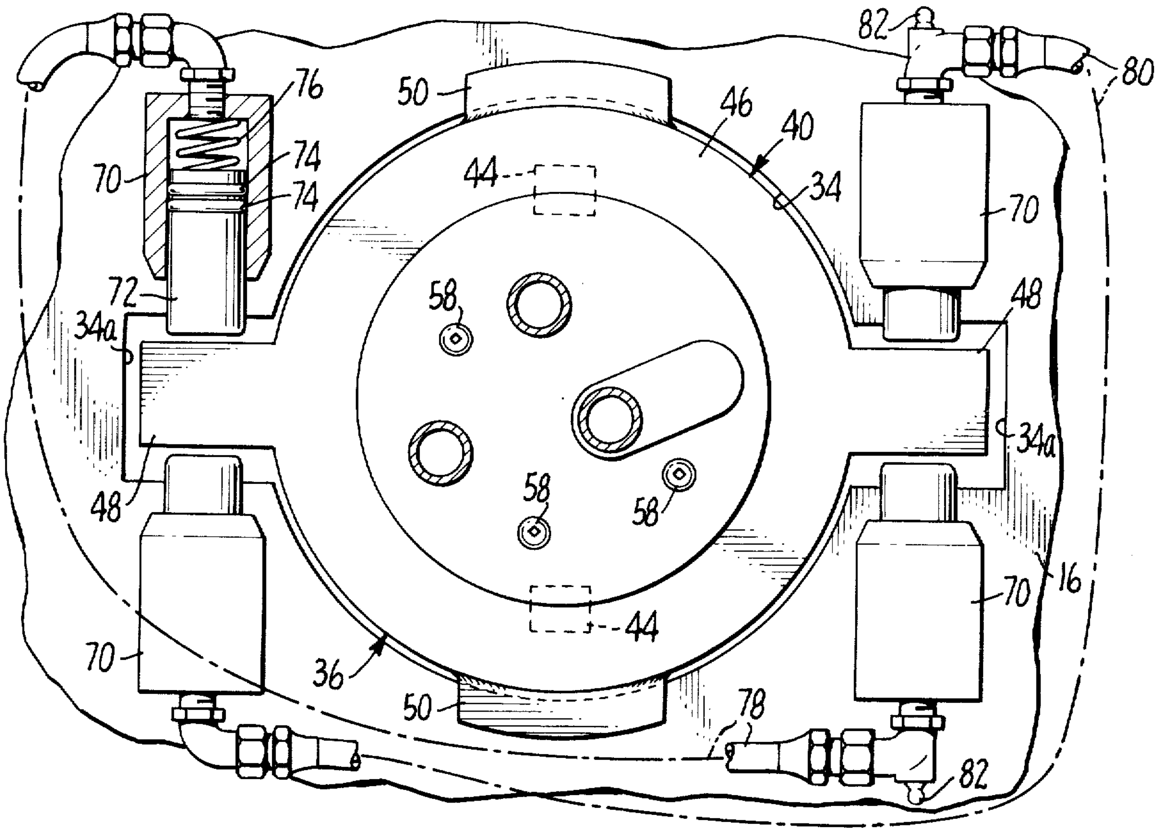
FIG. 3 is a plan view of the first embodiment of the collar of the invention, taken on the plane designated by line 3—3 in FIG. 1.

Referring now specifically to the first embodiment of the torque collar, as illustrated in FIGS. 1–3, this embodiment comprises hydraulic cylinders 70 fixedly mounted to the upper surface of the plate 16 to either side of each of the rectangular portions 34a of the opening 34. Each cylinder 70 carries a piston 72 extending therefrom for engagement with the extensions 48 of the stator collar 40. O-rings 74 establish sealed connection between the cylinders and the pistons and centering springs 76 are provided to extend the pistons relative to the cylinders to that the pistons normally tend to maintain the extensions 48 in centrally disposed position relative to the open rectangular portions 34a. The diametrically opposed cylinders 70 are coupled in fluid communication by hydraulic lines 78 and 80 and "Zirk" type fittings 82 are provided so that the lines may be selectively filled with an incompressible hydraulic fluid, such as grease.

In operation, once the first embodiment of the torque collar is assembled as illustrated in FIG. 3, it is conditioned for operation by placing a feeler gauge between each of the extensions 48 and one of the pistons 72 opposed thereto and then filling the lines 70 and 78 and the cylinders connected thereto with hydraulic fluid. Although not illustrated, it should be understood that the cylinders would be provided with suitable venting means to permit the bleeding of the lines and cylinders during the filling operation. Once the lines and cylinders are filled, the venting means would be closed and, preferably, the "Zirk" fittings would be replaced with fixed plugs. Then, the feeler gauges would be removed and, as a result, each of the extensions 48 would have a predetermined amount of free play relative to the pistons opposed thereto.

Once prepared for operation as described above, the torque collar of the first embodiment is ready for operation to resist torque transmitted to the stator 54 by the rotor 32. When the torque is in a clockwise direction, as designated by the arrow line in FIG. 3, this resistance is achieved by engagement of the extensions 48 with the pistons of the cylinders 70 connected by the lines 78. Engagement of both of the pistons 72 of the cylinders connected to the lines 78 is assured, since the hydraulic fluid within the lines functions to balance the force on the pistons. Should one piston be contacted prior to the other, said one piston will depress until such time as the other is forced into engagement with the extension 48 in opposition thereto. Thus, the torque-resisting forces applied to the extensions 48 are always balanced.

The cylinders 70 connected to the line 80 function when the torque forces applied to the stator are in a counterclockwise direction, as viewed in FIG. 3. These cylinders function in a manner identically to that described above with respect to the cylinders attached to the lines 78.

Figure 4:
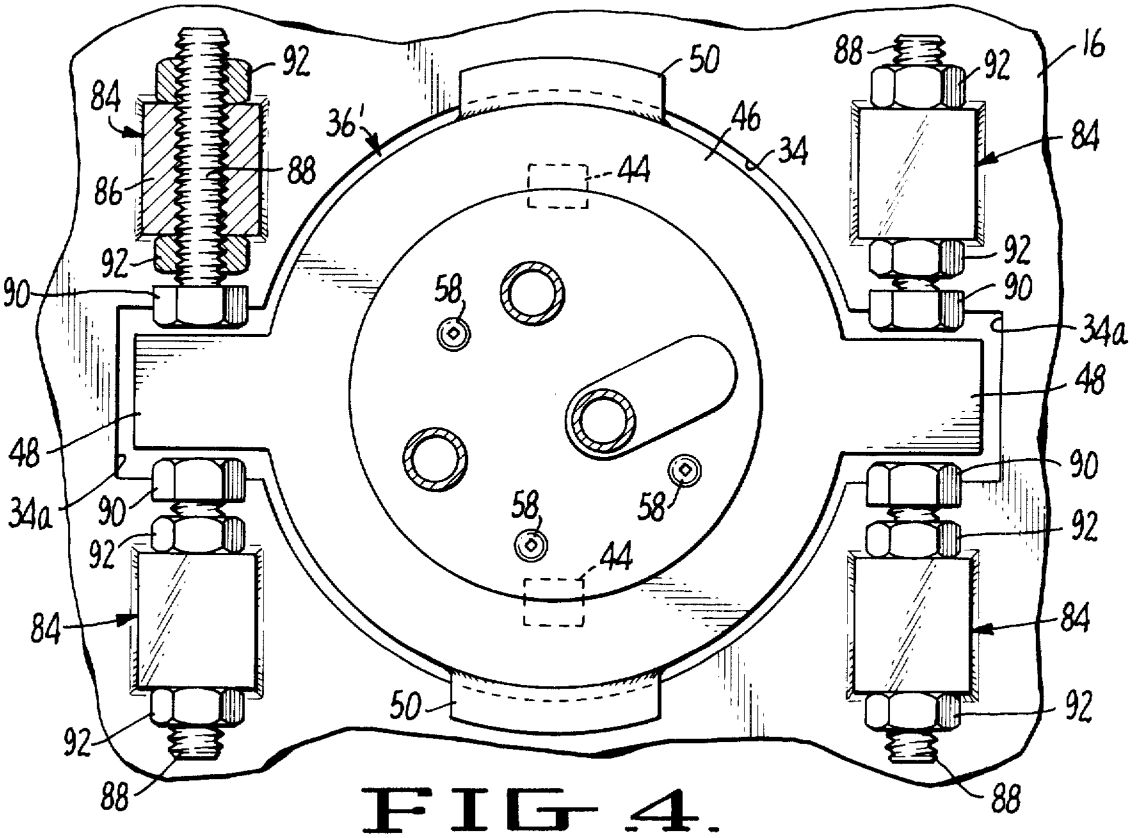
FIG. 4 is a plan view, similar to FIG. 3, illustrating a second embodiment of the torque collar of the present invention.

The second embodiment of the torque collar, as illustrated in FIG. 4 and designated by the numeral 36', is identical in construction to the first embodiment, with the exception that selectively adjustable fixed stops are used in place of the hydraulic cylinders 70. Accordingly, elements of the second embodiment corresponding to those of the first embodiment are designated by identical numerals. The selectively adjustable fixed stops, designated 84, of the second embodiment are fixedly mounted on the top of the plate 16 to either side of each of the open portions 34a. Each of the stops 84 comprises an internally threaded cylinder 86 threadably receiving a bolt 88 having a head 90 disposed for engagement with the extension 48 opposed thereto and a pair of lock nuts 92 threadably received on the bolt to either side of the cylinder.

To prepare the second embodiment for operation, lock nuts 92 are loosened and feeler gauges of identical thickness are inserted between diametrically opposed stops and the extensions 48 opposed thereto. The bolts 88 are then threadably adjusted within the cylinders 86 to bring the heads of the bolts into snug engagement with the feeler gauges and then the lock nuts 92 are tightened to fix the bolts against further movement. Once so conditioned, the feeler gauges are removed and, as a result, the heads 90 of the bolts of diametrically opposed stops are spaced from the extension 48 opposed thereto by equal distances.

Once the torque collar of the second embodiment is conditioned as described above, clockwise torque applied to the stator functions to move the extensions 48 into simultaneous engagement with the bolt heads 90 of one pair of diametrically opposed stops 84 and counter-clockwise torque applied to the stator functions to force the extensions 48 into engagement with the bolt heads 90 of the other pair of diametrically opposed stops 84. Thus, the collar provides for the balanced resistance of torque in either one or the other of the directions and for a predetermined amount of free play between the stator and the torque collar.

From the foregoing detailed description, it is believed apparent that the present invention enables the attainment of the objects initially set forth herein. In particular, the invention provides a torque collar wherein a controlled amount of free play may be provided between the stops of the collar and the stator of the motor and wherein torque forces applied to the collar are balanced. It should be understood, however, that the invention is not intended to be limited to the specifics of the embodiments herein illustrated and described, but rather it is defined by the following claims.

What is claimed is:

1. Torque resisting apparatus for use in combination with a high torque motor having a stator, a rotor mounted for rotation relative to said stator about an axis of rotation, and a plurality of torque transmitting means mounted on the stator in angularly spaced relationship about said axis of rotation to resist torque applied to the stator by the rotor, said apparatus comprising: a torque collar adapted to be disposed in an operative condition relative to the stator; stops carried by the collar, said stops each having a pair of opposed surfaces disposed for engagement with the torque transmitting means of a stator disposed in operative condition relative to the collar; a screw threaded member secured to each of the surfaces and extending through a mounting block therefor fixed to the collar; and means threadably received on the screw threaded members, said means being threadable on the threaded members to adjust the positions of the surfaces relative to the mounting blocks and lock the surfaces at select positions relative to the blocks to enable the adjustment of the opposed surfaces of the stops relative to torque transmitting means disposed for engagement therewith to provide for relative free play between the stops and torque transmitting means and simultaneous engagement of all of the stops and torque transmitting means at the end of said free play.

2. Torque resisting apparatus for use in combination with a high torque motor having a stator, a rotor mounted for rotation relative to said stator about an axis of rotation, and a plurality of torque transmitting means mounted on the stator in angularly spaced relationship about said axis of rotation to resist torque applied to the stator by the rotor, said apparatus comprising: a torque collar adapted to be disposed in an operative condition relative to the stator; stops carried by the collar, said stops each having a pair of opposed surfaces disposed for engagement with the torque transmitting means of a stator disposed in operative condition relative to the collar so that one stop of each pair resists clockwise torque and the other stop of each pair resists counterclockwise torque; hydraulic supports mounting the surfaces on the collar; and means hydraulically coupling the supports so that the supports for the surfaces disposed to resist clockwise torque balance one another in response to torque forces applied to said surfaces and the supports for the surfaces disposed to resist counter-clockwise torque balance one another in response to torque forces applied to said surfaces, said means functioning to adjust the positions of the opposed surfaces of the stops relative to torque transmitting means disposed for engagement therewith to provide for relative free play between the stops and torque transmitting means and simultaneous engagement of all of the stops and torque transmitting means at the end of said free play.

3. In a high torque motor: a stator; a rotor mounted for rotation relative to the stator about an axis of rotation; a plurality of torque transmitting means mounted on the stator in angularly spaced relationship about said axis of rotation to resist torque applied to the stator by the rotor; a torque resisting base member; stops carried by the base member, said stops each having one surface disposed to engage the torque transmitting means and resist clockwise torque applied to the stator and another surface disposed to engage the torque transmitting means and resist counter-clockwise torque applied to the stator; hydraulic supports mounting the surfaces on the stops for movement relative thereto in response to torque forces applied to the surfaces by the torque transmitting means; and means hydraulically coupling the hydraulic supports so that the surfaces of said stops disposed to resist clockwise torque balance one another in response to torque forces applied thereto and the surfaces of said stops disposed to resist counter-clockwise torque balance one another in response to torque forces applied thereto.

4. In a high torque motor: a stator; a rotor mounted for rotation relative to the stator about an axis of rotation; a plurality of torque transmitting means mounted on the stator in angularly spaced relationship about said axis of rotation to resist torque applied to the stator by the rotor; a torque resisting base member; stops carried by the base member and extending therefrom for engagement with the torque transmitting means to transmit torque from stator to the base member; and means hydraulically coupling the stops so that torque forces applied to the respective stops in response to the application of torque to the stator by the rotor balance one another.

* * * * *